(12) United States Patent
Woo et al.

(10) Patent No.: US 8,351,844 B2
(45) Date of Patent: Jan. 8, 2013

(54) SYSTEM AND METHOD FOR RELIABLY COMMUNICATING INFORMATION WITHOUT EXPLICIT ACKNOWLEDGEMENTS

(75) Inventors: Alec Woo, Union City, CA (US); David E Culler, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/549,700

(22) Filed: Jul. 16, 2012

(65) Prior Publication Data
US 2012/0276839 A1 Nov. 1, 2012

Related U.S. Application Data

(63) Continuation of application No. 12/955,073, filed on Nov. 29, 2010, now Pat. No. 8,224,235, which is a continuation of application No. 11/906,952, filed on Oct. 3, 2007, now Pat. No. 7,844,212.

(51) Int. Cl.
*H04H 20/71* (2008.01)
(52) U.S. Cl. ........ 455/3.01; 455/445; 455/510; 370/400
(58) Field of Classification Search ................. 455/3.01, 455/3.03, 412.1, 445, 500, 504, 510, 526; 370/254, 328, 329, 252, 400, 395.4, 374, 370/381, 312, 363, 368; 709/232, 224, 237
See application file for complete search history.

(56) References Cited

U.S. PATENT DOCUMENTS

| | | | |
|---|---|---|---|
| 4,939,728 A | 7/1990 | Markkula, Jr. et al. |
| 5,034,882 A | 7/1991 | Eisenhard et al. |
| 5,287,537 A | 2/1994 | Newmark et al. |
| 6,467,059 B1 | 10/2002 | Ohashi |
| 6,782,490 B2 | 8/2004 | Maxemchuk et al. |
| 7,562,277 B2 | 7/2009 | Park et al. |
| 7,844,212 B1 | 11/2010 | Woo et al. |
| 8,112,694 B1 | 2/2012 | Woo et al. |
| 2004/0120284 A1 | 6/2004 | Terry et al. |
| 2005/0053093 A1 | 3/2005 | Fukushima et al. |
| 2010/0061272 A1 | 3/2010 | Veillette |

OTHER PUBLICATIONS

Notice of Allowance mailed Aug. 4, 2010 in U.S. Appl. No. 11/906,962, 9 pages.
Ex Part Quayle Office Action mailed Apr. 25, 2011 in U.S. Appl. No. 11/906,965, 8 pages.
Notice of Allowance mailed Jul. 5, 2011 in U.S. Appl. No. 11/906,965, 5 pages.
Notice of Allowance mailed Apr. 17, 2012 in U.S. Appl. No. 12/955,073, 18 pages.

*Primary Examiner* — Sujatha Sharma
(74) *Attorney, Agent, or Firm* — Fish & Richardson P.C.

(57) ABSTRACT

A system and method communicates commands from a command originator to receiving devices, yet the receiving devices do not confirm receipt of the command. The most current command (e.g. the one with the highest sequence number) is rebroadcast by the command originator and the receiving devices, tending to be more frequent upon detection of an event indicating that the most current command was not received by at least one other device, and less frequently upon detection of an event indicating that the most current command was provided with sufficient duplication that if another device could receive it, the device likely did receive it, subject to a maximum and minimum rate.

25 Claims, 4 Drawing Sheets

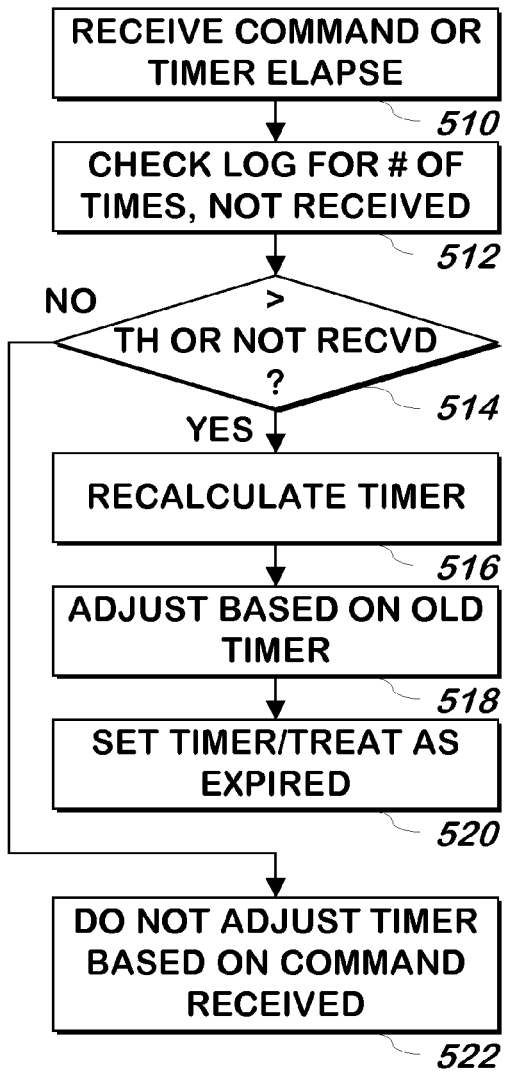
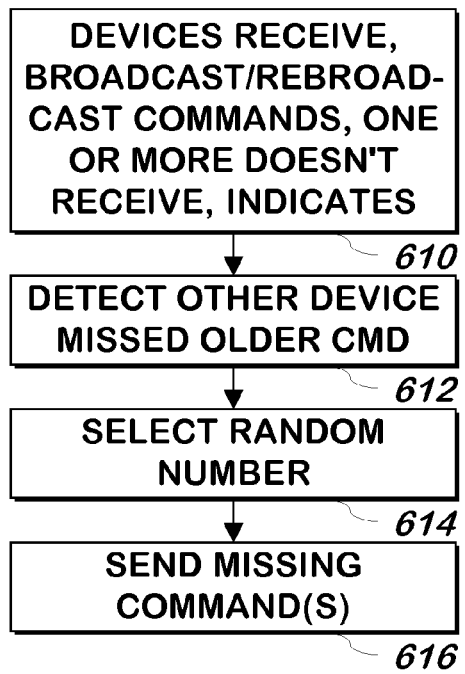
FIG. 5
FIG. 6

SYSTEM AND METHOD FOR RELIABLY COMMUNICATING INFORMATION WITHOUT EXPLICIT ACKNOWLEDGEMENTS

CROSS REFERENCE TO RELATED APPLICATIONS

This application is a continuation of U.S. application Ser. No. 12/955,073, filed Nov. 29, 2010, scheduled to issue as U.S. Pat. No. 3,224,235 on Jul. 17, 2012, which application is a continuation of U.S. application Ser. No. 11/906,952, filed Oct. 3, 2007, now U.S. Pat. No. 7,844,212 B1, issued Nov. 30, 2010, and is related to application Ser. No. 11/906,965, filed Oct. 3, 2007. The disclosures of the above-referenced applications are incorporated herein by reference in their entireties.

FIELD OF THE INVENTION

The present invention is related to computer software and more specifically to computer software for communicating commands.

BACKGROUND OF THE INVENTION

One device may send each communication to multiple recipients. If the communication is a wireless communication, the command may not be received due to a host of factors such as interference and the like. If it is desirable to ensure that all of the recipients have received the communication, some applications require each receiving device to send an acknowledgement that the communication was received. The sending device can then determine if an acknowledgment has not been received, and then resend the communication if any expected acknowledgement is not received.

However, there are several problems with this approach. One such problem is that this arrangement does not scale well. If a command is sent to several devices at the same time, or several different commands are sent in rapid succession to several different receiving devices, all of whom must send an acknowledgement, the amount of time it takes to send and receive the acknowledgements can exceed the amount of time between commands. Furthermore, if a device moves outside of the range of the sending device, or if due to interference, reflections or other such reasons a wireless command may not be received, the receiving device will not receive the command directly from the sending device, but may receive it from other devices. Sending acknowledgements back to the device that sent the command can require that the acknowledgement be sent through other devices, which can take up additional bandwidth.

What is needed is a system and method that can reliably provide commands without requiring all receiving devices to send an acknowledgement or overwhelming the available bandwidth of a communication system.

SUMMARY OF INVENTION

A system and method at the sender wirelessly sends a command or other communication and a counter or sequence number higher than the counter or sequence number of the preceding command. The receiving devices wirelessly receive and store the command and the sequence number, perform the command and set a timer for an amount of time that is at least partially random. If another command with a higher sequence number is received before the timer elapses, the timer is canceled, the command and sequence number are stored, the command is performed, and another timer is set for another at least partially random amount of time. If the timer elapses before a command with a higher sequence number is received, the system and method at the receiving device wirelessly broadcasts the command and the sequence number, wirelessly retransmitting it. The other receiving devices listen to the broadcasts of commands and compare the sequence number of each broadcast with the highest sequence number previously received.

If a device identifies that the sequence number broadcast exceeds the highest one previously received, that device clears its timer, stores the command and sequence number, performs the command, and sets a timer for an amount of time that is at least partially random, retransmitting the command and sequence number if another command with a higher sequence number is not received before the timer elapses. The timer may then be reset and the process can begin again.

Either or both of the timers described above may be set according to a function of any or all of the number of times the highest sequence number command was received within a period of time, whether commands have been received out of order or other indications that a different device did not receive one or more commands, as indicated by the sequence number of the commands or other indications, and the prior timer value. The more times the highest sequence number command was received, the more time that is allowed to elapse between retransmissions so that the available bandwidth is not overwhelmed with retransmissions that are probably not necessary, once a sufficiently large number of retransmissions of such commands have been received. If a command is indicated as having not been received by a device, less time is allowed to elapse between retransmissions. The prior timer value may be used as a basis for setting the new timer so that increases or decreases can occur gradually, based on the prior timer value. A pseudo-random number may be used in part to determine the value of the timer, so the timers of all devices will not move in the same direction, and those that do move in the same direction may move by differing amounts.

Because the devices will thus tend to send commands more frequently when an event is detected indicating that a command was not received by the device, namely, that device's rebroadcast of an out of order command, the system and method's increasing the timer value, thus reducing the frequency of rebroadcasts, has the counterintuitive effect of reducing the frequency of broadcasts in spite of the fact that one or more devices may not be receiving commands.

The originating device monitors the commands being sent and, if time permits before yet another command is to be provided, retransmits the highest sequence number command using an amount of time since the last time that command was transmitted that may be at least partially random, and is also based on any or all of the number of times the highest sequence number command was retransmitted by the receiving devices, whether commands were sent out of order (e.g. the command sent is not the highest sequence number command) or otherwise indicated as not being received and the previously used amount of time in a manner similar or identical to that used by the receiving devices. Thus, the originating device also uses the counterintuitive frequency reduction when events are detected indicating that one or more commands may not have been received.

The frequency of retransmissions may be adjusted as commands are received. For example, if an out of order command is received, the frequency of transmission may be recalculated in a manner that, on average, increases the frequency.

Not all devices may be in range of the originating device, and thus the rebroadcasting of commands in this fashion allows commands to be broadcasted in excess of the range of the originating device. However, no acknowledgements are needed because the system and method can repeatedly rebroadcast commands from various devices.

The system and method may operate with commands being received over different channels, the channels being physical channels using different frequencies or a single physical channel, but with the commands arriving with a channel identifier. The system and method treats the messages received over each channel independently from the others, and the retransmissions of a command received over a channel are made via that same channel.

The system and method may respond to an occurrence of several missed commands or a gap in the received commands by having the device that missed any such commands broadcast an indication of the commands missed, which may be performed by broadcasting the sequence number of the last command before the missed commands (instead of the highest sequence number command) or another indication of any missed commands either with the highest sequence number command or separately. Other devices can respond to those indications by providing one or more make up commands, the number (and which commands are provided) being based on a random number each device receiving the indication selects. The original indication may or may not affect the timer values in the same way as an out of sequence command would, but the make up commands need not affect the timer values.

BRIEF DESCRIPTION OF THE DRAWINGS

FIG. 5 is a flowchart illustrating a method of receiving a command and potentially adjusting a timer value according to one embodiment of the present invention.

FIG. 6 is a flowchart illustrating a method of sending one or more make up commands according to one embodiment of the present invention.

DETAILED DESCRIPTION OF A PREFERRED EMBODIMENT

Figure 1:
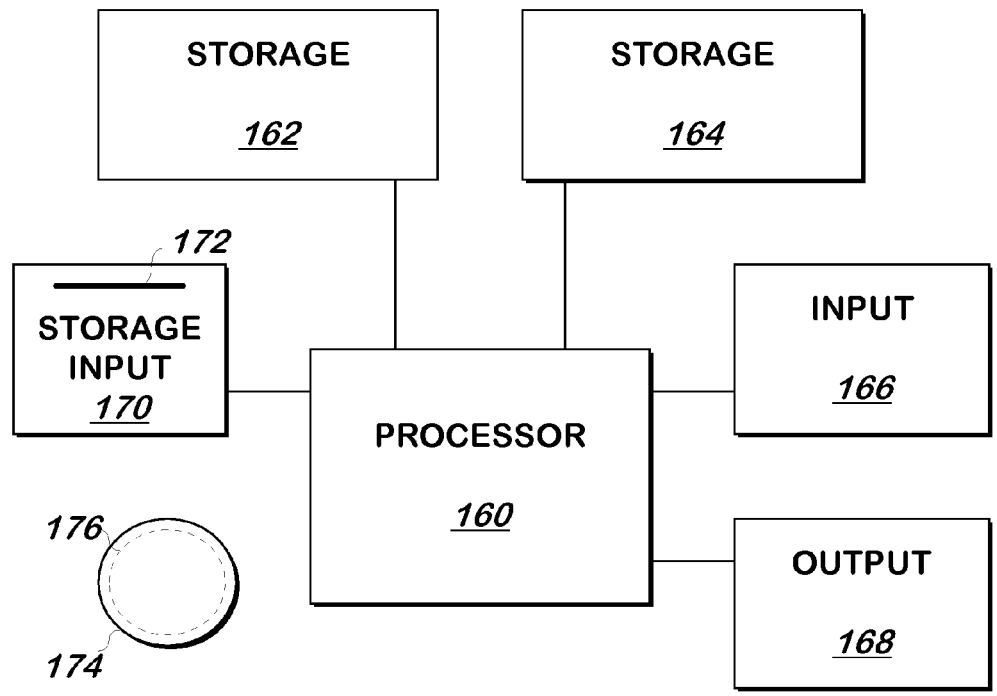
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Texas running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

Figures 2A, 2B:
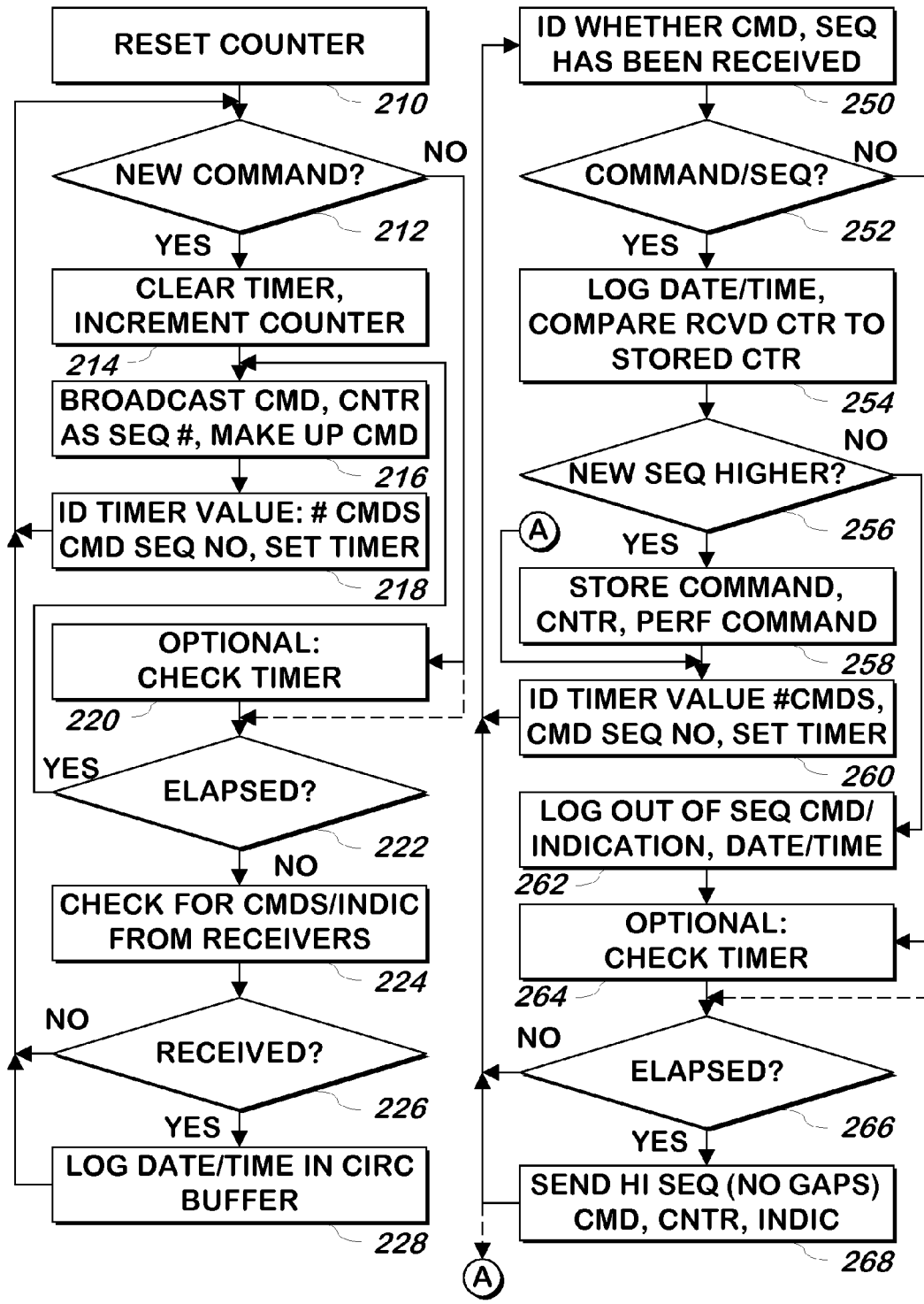
FIG. 2A is a flowchart illustrating a method of communicating a command according to one embodiment of the present invention.
FIG. 2B is a flowchart illustrating a method of receiving and performing a command according to one embodiment of the present invention.

Referring now to FIG. 2A, a method of broadcasting communications is shown according to one embodiment of the present invention. Commands are used as one embodiment of the communications, but the communications may be any form of information, and need not actually be commands. A counter is reset 210. A determination is made as to whether a new command is to be broadcast, for example, wirelessly, and if so, 212, the counter (or counter for the channel) is incremented 214 and the command and the counter value (as the sequence number of the command) are broadcast (or broadcast on the channel) 216.

The determination of whether a new command is to be broadcast may be a function of an event, for example receipt of a command from another process or a timer elapsing, causing the command to be retrieved, for example, from a buffer, if the buffer has such a command, after which the buffer is cleared.

A new command may be broadcast if the command is received, for example, from a separate process. In one embodiment, different channels may be used to broadcast different commands. In one embodiment, the command and sequence number are broadcast over a channel, having an identifier based on, or received with, the command, counter or both. In this embodiment, each of several channels corresponds to a different frequency from the other channels. In another embodiment, a single frequency is used for multiple channels, but a logical channel identifier, based on, or received with, the command, counter, or both, is broadcast with the command and sequence number.

As described in more detail below, the counter is broadcast with the command as the sequence number of the command, and can be used to allow receiving devices to determine the order in which at least two of the commands were broadcast. As described herein, the sequence number of the most recently broadcast command will be higher than the sequence number of less recently broadcast commands.

Figure 4:
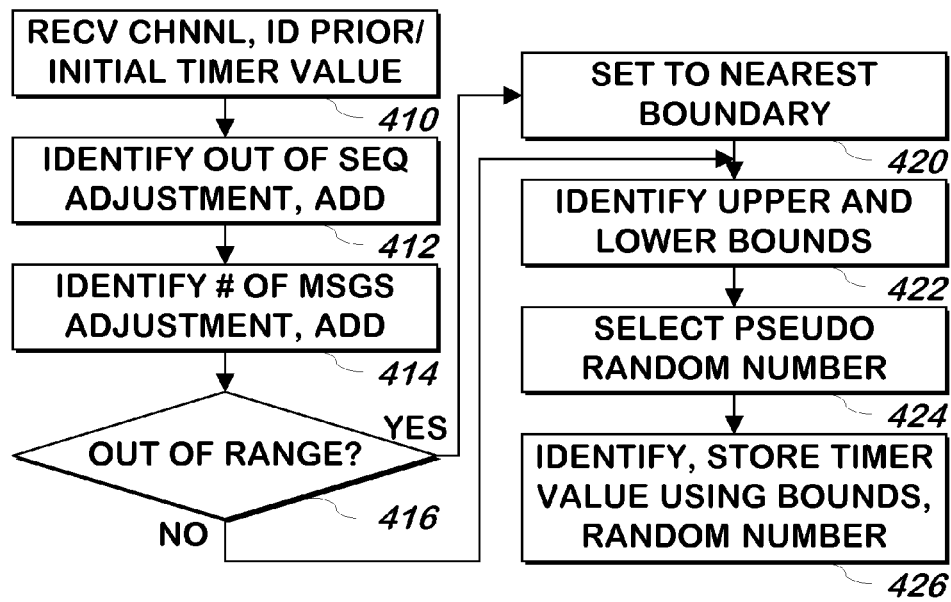
FIG. 4 is a flowchart illustrating a method of identifying a timer value according to one embodiment of the present invention.

A timer value (or a timer value for the channel on which the command was sent) is randomly identified 218 between an upper and lower bounds that are based on any or all of: any prior timer value, such as the most recently set timer value, whether a number of times the highest sequence number command has been received (or received on the same channel as the command recently broadcast) exceeds a threshold, whether any commands received (or received on the same channel) since the last time the timer was set were rebroadcast out of order or otherwise indicated as not having been received, and the prior timer value limits, as described in more detail below with respect to FIG. 4. In one embodiment, the upper and lower bounds are set higher (making the timer value longer and any timer based thereon less frequent) if the number of times the command with the highest sequence number was received exceeds a threshold. The upper and lower bounds are set lower if a command is received out of order or an indication is received that indicates that the most recent command was not received, and may be set higher otherwise. In one embodiment, the upper and lower bounds are set lower if an indication is received that indicates that any command was not received, not just the highest sequence number command. In one embodiment, the upper and lower bounds may be set to not lower, and not higher, than an absolute upper and lower bounds for each. A timer is set using the timer value identified 218. The method continues at step 212. In one embodiment, a command received by a device is determined to be out of order if it has a sequence number earlier than any other command generated, received, or received on the same channel as the command, by that same device. In one embodiment, a command received by a device within a threshold amount of time as the first command with the next highest sequence number was generated or received by that device will not be considered to be out of sequence.

In one embodiment, step 218 includes clearing any previously set timer (or the previously set timer corresponding to the channel that corresponds to the command).

If a new command is not to be sent 212, the method continues at step 220. At step 220, a timer (or all the timers in the embodiment in which different channels are used) may be checked. In one embodiment, the timer (or timers) need not be checked, because a notification is received when the timer has elapsed. In such embodiment instead of continuing at step 220, the method continues at step 222, as shown by the dashed line in the Figure.

At step 222, if the timer (or one of the timers) has elapsed, the method continues at step 216. This will cause the most recently provided command and sequence number to be rebroadcast (or the most recently-provided command and sequence number for the channel corresponding to the elapsed timer to be rebroadcast). Step 216 may include broadcasting any make up commands corresponding to commands older than the highest sequence number command that are indicated as not having been received, or other indications that such older commands have not been received, such out of order commands or indications having been received since the last time step 216 was performed.

Otherwise 222, a determination is made as to whether any commands or indications have been received from receiving devices 224. Receiving devices are devices that will receive the commands broadcast as described herein. Such received commands may be provided by receiving devices as described with respect to FIG. 2B, and the determination may be made by checking a buffer into which such commands are stored. If any commands or indications have been received from receiving devices 226, the date and time (and optionally, the channel) that such commands or indications were received may be logged into a circular buffer 228 along with the sequence number or numbers to which the commands or indications correspond, and the method continues at step 212. The circular buffer may be used to determine whether out of order commands have been received indication of missed commands have been received or the number of times the highest sequence number command has been received. If no such commands have been received 226, the method continues at step 212.

Referring now to FIG. 2B, a method of receiving and performing commands is shown according to one embodiment of the present invention. A determination may be made as to whether a command and its sequence number have been received 250. In one embodiment, this determination may be made by checking a buffer into which such commands that have been recently received but not processed may be stored.

In one embodiment, the buffer includes not only the command and the sequence number, but also a channel identifier corresponding to the command, either because the channel identifier was received with the command and sequence number, or because the command and sequence number were received on a specific frequency, and the channel identifier was added to the command and sequence number based on the frequency over which they were received.

If the command and sequence number have been received 252, the sequence number of the command received is compared to the sequence numbers corresponding to one or more commands previously received 254. In the embodiment in which different channels may be used, the comparison is made only among sequence numbers of commands received on the same channel.

If there are no previously received commands (optionally, on the same channel), or the new sequence number is higher than that of the command previously received 256 (optionally, on the same channel), the command and sequence number (and optionally, the channel identifier) are stored, and the command is performed 258. In one embodiment, the command is only performed if the command corresponds to the recipient of the command. In one embodiment, the command corresponds to a recipient of the command if the channel corresponding to the command corresponds to a certain subset of the available channel identifiers, with different devices or groups of devices using different subsets.

In one embodiment, commands are only performed if no prior commands (for the same channel) after the initial command (for a channel) are missing as described herein. In one embodiment, if such a prior command is missing, that command will be held until no such prior commands are missing, or optionally a threshold amount of time elapses from when the command was received.

A timer value is identified based on a number of times the command with that sequence number has been received (e.g. whether the number of times exceeds a threshold), whether any commands have been received out of order, or other indications that a device has missed one or more commands, any prior timer value or an upper or lower bounds used to select the prior timer value, and a pseudo random number as described herein (optionally, on the same channel as the received command) as described in more detail herein, and a timer is set based on the timer value 260. In the embodiment in which different channels are used, there will be a different timer for each channel from which a command was received and the timer corresponding to the channel on which the command was received is the one that is set in step 260. The method continues at step 250. In one embodiment, the timer (if only a single channel is used) or the timer corresponding to the command received (if multiple channels are used) is reset before setting the timer as part of step 260.

If at step 256 the newly received sequence number is not higher than the sequence number corresponding to the previously received command, the command (or command and channel identifier), sequence number and date and time are stored if the command is not received out of order or, if the command is received out of order or another indication of a missing one or more commands is received, an indication that an out of order command was received (or the indication and channel identifier), the sequence number or numbers, and the date and time are stored.

If at step 252 the command and sequence number are not received, the method continues at step 264 or 266.

At step 264, a timer is (or all timers are) optionally checked. As described above the timer need not be checked if any timer signals when it has elapsed. At step 266 if the timer has elapsed, the command with the highest sequence number (or the highest sequence number command that corresponds to the channel to which the elapsed timer corresponds) is broadcast (optionally, on the channel on which that command was received or with the channel identifier received with that command) along with the sequence number 268, and the method continues at step 250 or step 260. Otherwise 266, the method continues at step 250. As part of step 268, make up commands, described below, may be broadcast for any indication regarding a different device missing a command that a for the same channel that were received since the last iteration of step 268 for the channel.

Thus, the method of FIG. 2B includes processing commands that have been received that have a higher sequence number than any previously received command, or any previously received command for the channel on which the command was received, and setting a timer or a timer corresponding to the channel for which the command was received. If the timer elapses before the next such command is received, the highest sequence number command or highest sequence number command for the channel is sent by the same device that previously received it.

As noted above, the timer values may be identified at step 218 of FIG. 2A or at step 260 of FIG. 2B. In one embodiment a timer value is identified based on a pseudo random number selected between upper and lower bounds. The upper and lower bounds may be adjusted higher, up to a set of maximums or lower, down to a set of minimums, based on any or all of the following: whether the number of times the highest sequence number command was received or received on the same channel exceeds a threshold, whether a command was received out of order since the last time the timer was set, and the prior value of the upper and lower bounds or the prior timer value.

The upper and lower bounds are set higher if the number of times the command sent or received with the highest sequence number (optionally for the same channel) exceeds a threshold, and the upper bounds and lower bounds are set lower if that number does not exceed the threshold. The upper and lower bounds are set higher if no out of order command was received (or received on a channel) or other indications of missed commands were received since the last time the timer value was set (or was set for that channel) and may be set lower otherwise.

The upper and lower bounds may be increased or decreased from the previous value of the upper and lower bounds, as high as a set of maximum values or as low as a set of minimum values. Other functions may be used to identify the timer value, so long as the timer value (for a channel) on the average is at least partially dependent on the number of times the most current command was received (for the channel), or the timer value (for a channel) on average, is at least partially dependent on whether any out of order commands have been received (on the channel), or the number of such commands. Thus, the upper and lower bounds can go lower, or higher in response to events occurring in successive timer periods.

The purpose of the adjustments of the timer values as described herein is to tend to retransmit commands more frequently in response to at least one event that indicates that a device did not receive the highest sequence number command (for a channel). The events include the receipt of out of order commands, though they may not include the receipt of certain retransmitted commands. The pseudo random selection within the upper and lower bounds can assist in reducing collisions from different devices, and basing the upper and lower bounds at least partially on their prior values smoothes fluctuations, for example, so that thrashing doesn't occur in response to isolated events.

In one embodiment, the commands and indications are logged as described in steps 254 and 228. Such logging may be performed in a circular buffer so that only the most recent values are stored. The storage of the date and time allow timer values to be set, for example based on the number of highest sequence number commands received or the number of out of order commands or other indications of missed commands in a given amount of time, and can be used to retrieve older commands to be broadcast as part of make up commands. Such commands may be limited to those received in a time window, such as the last 30 seconds, and as noted, to the same channel as the command being processed. When timer values are set, the date and time the timer value was set may be retrieved and stored as part of the setting of the timer values to assist with the determinations described herein. Indications used to set the timer value may be cleared after they are no longer needed.

There may be multiple receiving devices as are described with reference to FIG. 2B, and one or more devices that originate the transmission of commands as described with reference to FIG. 2A, and such originating device may broadcast on one or more channels, with any other originating devices broadcasting on the same one or more channels, an entirely different set of one or more channels, or one or more of each type of channels.

Each such receiving device will process information received from the originating device and information retransmitted from other receiving devices as described above with reference to FIG. 2B. Thus commands are propagated from device to device, with each device processing them as described with reference to FIG. 2B whether the command was received from the originator or another device.

During periods in which a device does not receive a broadcast command, for example, because the receiving device is out of range of other devices, or there is a lengthy period of interference, the device will broadcast its most recently received command (or the most recently received command for each channel), but that command will be broadcast out of order, causing other devices or the originating device to rebroadcast their commands more frequently. (Such broadcasts are referred to herein as "rebroadcasts", including the very first one performed by the receiving device, as the device is rebroadcasting the command and sequence number it received.) In one embodiment, the more devices that do not receive a command, the more frequently the other devices will rebroadcast their most current command, or most current command on a channel. The other devices will detect the increase in broadcasts, and less frequently rebroadcast such commands when the threshold is reached. Each of these provides a feedback for the other, so that the rebroadcasts will be picked up by other devices, causing them to rebroadcast such commands less frequently.

If the commands are originated infrequently, any command not received and others received soon thereafter will be rebroadcast more frequently than they would be otherwise, causing subsequent commands to be more likely to be received. As the frequency of rebroadcasting is raised to overcome the problems, the increases will cease. The frequency of rebroadcasts will start to fall. If the problems remain, the frequency will stay relatively high, and will be relatively low otherwise. Thus, the system and method can adapt to any changes in condition, either raising or lowering to the level that allows an acceptable level of transmissions to be received, yet not rising higher or lower than a maximum or minimum. The partially random timing of the rebroadcasts serves to correct any problems, yet avoids collisions.

In one embodiment, the frequency will tend, on average, towards a given low frequency when a certain number of commands are received and none are received out of order. It is noted that following a command received out of order, the highest sequence number command will be rebroadcast more frequently, potentially causing the threshold to be met, which will reduce the frequency of transmission. Thus, following an event indicating the command was not received, the frequency will be lowered.

It is noted that the present invention works "sineacknowledgemtly", that is, without sending explicit acknowledgements either very soon after a command is received or ones which do not contain the command itself. Because different devices operate on different timer schedules, if there are a relatively large number of devices, the fact that different devices will be on different timer schedules and will rebroadcast at the end of their timers means that every command will likely be rebroadcast one or more times. Thus, even if a device misses one broadcast of a command, it is likely that it will receive that same command many times.

Missing Commands

As noted, the devices may be mobile. If a device is out of range of the originating device and other devices for a period of time, that device may not receive one or more commands, but then will receive a command when it is back in range. Thus, it would not be able to communicate the fact that it was not receiving commands. When the device comes back into range, it will receive the latest command and thus, if it communicated the highest-sequence number command, it would mask the fact that there may have been other commands that were not received. There may be other reasons that such a circumstance could occur.

In one embodiment, instead of broadcasting the highest sequence command received, the device will broadcast the highest sequence command that has been received without sequence number gaps (on the channel), and otherwise operates as described above. Thus, for a device that receives commands with sequence numbers 9, 10 and 15, the device will broadcast the command with sequence number 10, including that sequence number. The other devices will broadcast make up commands between the command with the sequence number 10 and the highest sequence number commands as described above. For example, each device may select a pseudo random number and then select the make up command or commands to broadcast, or not broadcast any command, based on the pseudo random number. In this embodiment, command 15 would be broadcast as a make up command in spite of the fact that the device has already received it. One device may broadcast commands 11, 12 and 13 and another device may broadcast command 14. Still another device may broadcast all the missing commands and still another device may broadcast no commands.

In still another embodiment, a device will broadcast the highest sequence command it has received as described above, but also with that broadcast, or as part of a separate broadcast, the device will also indicate which commands prior to the highest sequence number command that the device has not received. This may be done as part of step 268. The other devices receiving the indication will respond with make up commands as described above, optionally in response to a random number each device receiving the indication of commands missed will select. Make up commands received are not used to change the timers in one embodiment.

There are various ways of rebroadcasting one or more make up commands. FIG. 6 is a flowchart illustrating a method of providing make up commands according to one embodiment of the present invention. The method of FIG. 6 may be performed by the originating device or any receiving device. Referring momentarily to FIG. 6, devices receive commands and broadcast them and/or rebroadcast them in the manner described above, but at least one device does not receive one or more of the broadcast or rebroadcast commands and so indicates as described herein 610. The missing command or commands may include the highest sequence number command available (for a channel) or that would include commands that came earlier in the sequence than the highest sequence number command. In one embodiment, each device that detects 612 the condition and has received a command with a sequence number that is at least one higher than the sequence number it receives (for the channel) that indicates that another device did not receive a command (either because that device broadcast a command with a sequence number that is two or more less than the highest sequence number command sent or received by the device performing the method, or because a device broadcast an indication that it did not receive one or more commands), may select a random number 614, and based on the random number it selects, sends 616 zero, one or more of the missing commands, along with an indicator that the command is being sent as a make up command. Whether a device sends any make up commands at all, and if so, the number, and which of the make up commands are sent, may depend on the random number selected by each device, as well as the number of times that the device received any commands that would be provided as make up commands from a different device after the one that sent the out of order command or indication indicating a command other than the highest sequence number command was not received. Devices that receive such a make-up command will not register the command as one that is being received out of order, though they may or may not use the highest sequence number command sent as part of a make-up command to adjust their timers based on the number of commands received as described above.

Thus, the commands that may be rebroadcast as make up commands may include those that have already been rebroadcast previously as the highest sequence number command by the same device or by a different device.

Thus, only devices local to the one that did not receive the commands will respond in this fashion, and the responses will not propagate away from the device that did not receive the multiple commands, containing the response to that local area. The use of the random number to determine whether a device will send any of these missed commands at all helps to keep low the number of devices responding so as not to flood the airwaves with such make-up commands by all devices.

Referring now to FIG. 4, a method of identifying a timer value that will be used to set a timer is shown according to one embodiment of the present invention. Some or all of the method of FIG. 4 may be employed in any of the circumstances described herein where a timer value was determined. It is noted that there are many ways of identifying timer values and thus, FIG. 4 is but one representation. Not every step of FIG. 4 need be used, and different steps may be added. Even if the same result is desired for setting a timer value, other ways of accomplishing the same result as is described in FIG. 4 may be used.

A channel identifier is optionally received and a prior timer value or value for the channel is identified 410. If no prior timer value was used, an initial value may be used. In one embodiment, the initial value is the lowest possible value, or the highest possible value, or halfway between. Other initial values may be used, such as the average of the prior upper and lower bounds for the timer.

An adjustment to the timer value identified in step 410 is identified 412 due to out of sequence commands received (over the channel), or other indications received that a device did not receive (over the channel) the highest sequence number command or any command, in the most recent period. In one embodiment, if the indication is that the highest sequence number command is received but a prior command in the sequence was not received, the timer may be adjusted or may not be adjusted. The most recent period may be a fixed window, the amount of time between the current time and the prior time the timer was identified, or elapsed, or any other period. The adjustment identified in step 412 may be a fixed number equal to or below zero if any out of sequence commands were received in such period, and a fixed number above equal to or above zero otherwise. The fixed numbers may have the same absolute values or different absolute values. As part of step 412, the adjustment is added to the timer value identified in step 410.

An adjustment to the timer value due to the number of times the highest sequence number command was received, or received over the channel, is identified 414. This adjustment can measure, at least in part, the number of devices that received an out of order command, or out of order command via the channel, via a rebroadcast, because such devices will more frequently rebroadcast their commands, causing this number to rise more quickly. The adjustment may be made on the basis of the number of such commands, with those above a threshold resulting in a negative or zero adjustment, and those under the threshold resulting in a zero or positive adjustment. The absolute value of the adjustment may be the same value for either positive or negative values, or it may be different for each. The adjustment values may be fixed, or variable, for example, being a function of how far over or under the threshold the number of commands is or how long it took to reach the threshold from the first time that command was received. The threshold may be fixed or variable, for example, being a function of the number of other commands received or received in one or more prior periods, an average of such numbers, or a weighted average, with higher weights on more or less recent numbers of commands. The adjustment identified is added to the value identified in step 410, or that value as adjusted in step 412.

If the resulting timer value is outside of a range of permissible adjustment results 416, the timer value is set to the nearest boundary of the range 420 and the method continues at step 422, and otherwise 416, the method continues at step 422.

At step 422, an upper and lower bounds is identified. The upper and lower bounds may be identified centered around the resulting timer value or using asymmetrical spacing between the timer value and each of the bounds. A random or pseudo-random number between the upper and lower bounds is selected 424 and this number is identified as the timer value to use 426. The timer value may be stored as part of step 426 for use at the next iteration.

It is noted that the highest sequence number command may be different depending on the device. For example, the originating device may broadcast a command with sequence number 35, and so the originating device and the devices within broadcast range of the originating device will consider the command with sequence number 35 to be the highest sequence number command for the channel. However, some devices may be out of range of the originating device, receiving commands only from rebroadcasts by a device within range of the originating device. For those devices, the highest sequence number command may be the command with sequence number 34. Thus, the commands may propagate out from the originating device vie any of several hops through other devices. An out of order command is a command that is received (on a channel) that has a lower sequence number than any previously received command (on the same channel) after the first command is received (on the channel). To accommodate the propagation delay as commands propagate away from the command originator, in one embodiment, receipt of the prior sequence number command may only change the timer value after a certain amount of time has passed after receipt of the highest sequence number command, or after a device rebroadcasts such a command.

Adjusting the Timer Values As Commands are Received

In the embodiment described above, the timer is reevaluated each time a command is sent by the originating device or received by a receiving device. In one embodiment, the timer is reevaluated upon the detection of an event that indicates the highest sequence number command received by the device or sent by the device has been received a threshold number of times or has not been received by a different device. This may be performed in addition to, or instead of the timer reevaluations described above. Either instead of, or in addition to, any of the timer reevaluations described above, the timer value is reevaluated as described above when the timer elapses, when a command is received that is out of sequence, an indication is received that the highest sequence number command has not been received or any command has not been received, or when the number of times the highest sequence number command is received exceeds a threshold. In the embodiment in which multiple channels may be used, the timer for the channel is reevaluated when any of the above events occurs for that channel.

In one embodiment, any or all of the timer values may be adjusted as commands are received. For example, if a command is received out of order or another indication of a missed command is received, or the number of the times the command with the highest sequence number is received exceeds the threshold, the process of selecting the timer value may be performed again as described above, and the difference between the existing timer value and the newly calculated timer value may be added to the timer value, thereby adjusting it. Referring now to FIG. 5, a method of receiving a command and potentially adjusting a timer value is shown according to one embodiment of the present invention. A command or indication or both is received and logged as described herein 510. The log is checked to determine whether the command is out of order, the indication indicates that such command or any command was not received, or if the command is the highest sequence number command (for its channel), whether the number of times the command was received has exceeded a threshold 512. If so 514, the timer value is recalculated as described herein 516, any amount of time remaining on the existing timer is optionally subtracted from the newly identified timer value 518, and the result is used to set the timer 520 (if the result is negative, the timer is set to zero, and/or the actions may be performed as if the timer had expired). It is noted that the newly calculated timer value will be used as the base timer value for the next calculation, and not the subtracted result and so such timer value may be stored as part of step 520. If the command received is not out of order, or no indication was received, or was received indicating the highest sequence number command was not received and the number of times the highest sequence number command has been received does not exceed the threshold 514, the timer value is not reset 522. Each of these possible events may be determined for the channel on which the command or indication was received. Potentially recomputing the timer in this manner may be performed by the originating device or any receiving device or both. The recomputing is performed for the channel corresponding to the command received, and the use of the prior commands received is limited to those for the same channel as the newly received command in the embodiment in which different channels are used.

The adjustment of the timer value to subtract any remaining amount on the prior timer may also be incorporated into the other reevaluations of the timer values described in FIGS. 2A or 2B. As noted either or both of such reevaluations need not be performed.

It is noted that the sequence numbers of the commands specify the order of the commands, and need not be numbers, but any identifier capable of communicating an order. As described herein, the highest sequence number designates the most current command but other indications of order may be used.

Figure 3A:
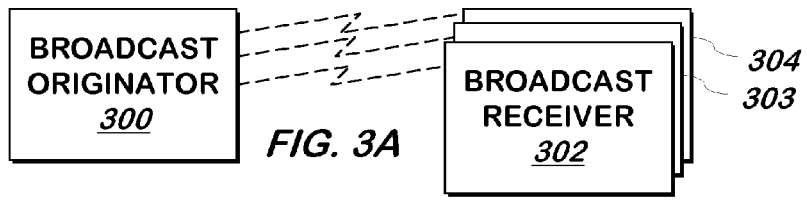
FIG. 3 is a block schematic diagram of a system for communicating a command according to one embodiment of the present invention.

FIG. 3A is a block schematic diagram of a system for communicating a command, according to one embodiment of the present invention. The system shown contains one broadcast originator 300 and three broadcast receivers 302-304, each of which may rebroadcast any received broadcast as described herein. It is noted that all devices 300-304 send and receive commands. Although for purposes of illustration one broadcast originator 300 and three broadcast receivers 302-304 are shown, in other embodiments multiple broadcast originators may be included, and large numbers, for example tens, hundreds, or thousands, of broadcast receivers may also be included. Each broadcast originator operates similarly or identically to broadcast originator 300, and each broadcast receiver operates similarly or identically to broadcast receiver 302. At least one broadcast originator 300 and at least two broadcast receivers 302-303 are included in one embodiment of the present invention. In one embodiment, broadcast receiver 302 may have gone outside of the range of other devices 300, 303-304 and may not have received one or more commands that they have rebroadcast as described above. Broadcast receiver 302 may then come back into range of one or more of them. It is noted that devices 300 and 302-304 may be referred to as "devices".

Figure 3B:
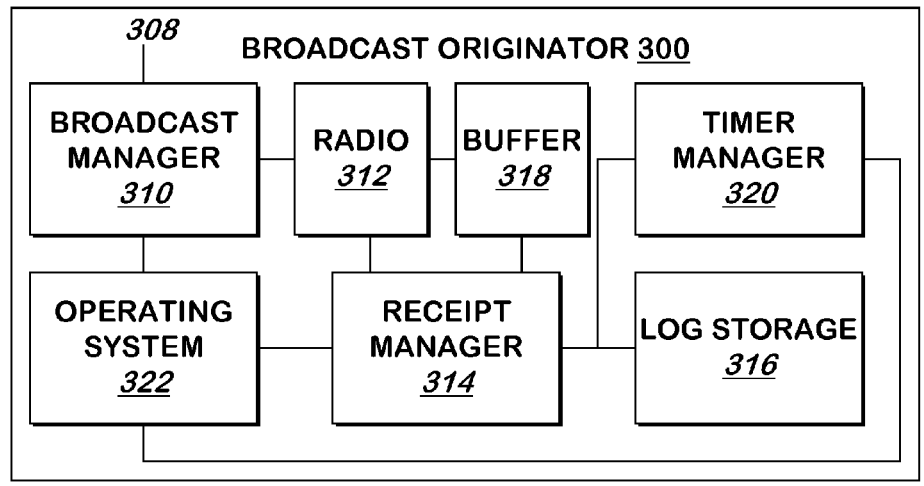

FIG. 3B shows broadcast originator 300 in more detail, according to one embodiment of the present invention. Referring now to FIG. 3B, on system startup, broadcast manager 310 initializes a counter it stores internally.

At any time, broadcast manager 310 may receive a new command from an external process (not shown), via input 308, which may be coupled to a local area network, such as an Ethernet, a wide area network, such as the Internet, or both. As noted above, such receipt may be as a result of broadcast manager retrieving the command. Such retrieval may be event driven as described above.

Broadcast manager 310 may contain a TCP/IP-compatible communication interface running conventional communications protocols. In one embodiment, as described above, multiple broadcast channels may be used, either corresponding to different frequencies or to different logical channels. In one embodiment, the command received by broadcast manager 310 includes an identifier of the channel to be used for broadcast. In another embodiment, the command includes an identifier of the process that sent the command. In this embodiment, broadcast manager 310 internally stores a table provided by a system administrator that indicates which channel is associated with each process, and broadcast manager 310 uses the table and the process identifier to determine which channel should be used for broadcast. Alternatively, in yet another embodiment, the table instead indicates which channel is associated with each different type of command, and broadcast manager 310 determines which channel should be used for broadcast by parsing the command. In another embodiment, all commands are sent on the same channel.

When broadcast manager 310 has received the command and optionally determined which channel should be used for broadcast, broadcast manager 310 increments the counter or the counter for the channel it stores internally as described above. Broadcast manager 310 appends the value of the counter to the command as its sequence number. Broadcast manager 310 then broadcasts the command, including the sequence number, via radio 312, using the appropriate channel if one was identified. In one embodiment, radio 312 is a conventional IEEE 802.15.x-compatible radio that provides some or all of the capabilities described by one or more 802.15.x specifications. Radio 312 transmits and receives data over a wireless network, though wired networks may also be used. Other radios and/or protocols may be used, such as the conventional 802.11 a/b/g/h or other similar protocols. Broadcast manager 310 logs the command, any channel identifier, and the sequence number of the command in log storage 316 so that it may be rebroadcast or used to supply a make up command as needed.

In one embodiment, broadcast manager 310 also signals timer manager 320, or alternatively, in the embodiment that multiple channels are used, provides timer manager 320 with an identifier of the channel used for broadcast. Broadcast manager 310 retains the command and any channel identifier. Additionally, broadcast manager 310 uses operating system 322 to clear any timer currently running, or in the embodiment that multiple channels are used, any timer associated with the channel used for broadcast.

When timer manager 320 receives a signal or a channel identifier from broadcast manager 310, timer manager 320 identifies a timer value or timer value for that channel. As described above, in one embodiment, the timer is set to a pseudo random number between predetermined upper and lower bounds. Timer manager 320 sets the upper and lower bounds higher if a threshold number of the highest sequence number command (for the channel) have been received recently by receipt manager 314 as described below, and lower if fewer than the threshold number of such command have been recently received. In this embodiment, timer manager 320 identifies the number of such commands recently received by checking log storage 316. As described in more detail below, when receipt manager 314 receives commands, receipt manager 314 stores the date and time, and optionally the channel on which such commands were received, in log storage 316. To determine the number of highest sequence number commands received, timer manager 320 determines the number of such commands logged in log storage 316. In the embodiment in which timer manager 320 received from broadcast manager 310 an identifier of the channel to be used for broadcast, timer manager 320 counts only the highest sequence number commands in log storage 316 which were logged on that channel. As described above, timer manager 320 sets the upper and lower bounds for the timer value as a function of the number of highest sequence number commands recently received, or recently received for that channel, and a threshold, and then optionally determines a pseudo random number within those bounds. In one embodiment, in order to ensure that reasonable timer values are achieved even in periods of radio silence or of extreme radio activity, timer manager 320 will set the bounds not higher or lower than predetermined threshold values: for example, a lower bound of second and a higher bound of thirty seconds.

In one embodiment, the upper and lower bounds set by timer manager 320 may be a function of the number of out of order commands or indications of one or more missing commands, either in addition to, or instead of, the issues affecting it as described herein. In one embodiment the more out of order commands received, the higher the upper and lower bounds.

The upper bounds selected by timer manager 320 may also be a function of the prior upper and lower bounds, or prior upper and lower bounds for the channel corresponding to the identifier received, with any new upper and lower bounds not deviating from the former upper and lower bounds or upper and lower bounds for the same channel, by more than a maximum number or numbers in either direction. In one embodiment, an absolute upper and lower bounds is used by timer manager 320, which will not go beyond that absolute upper and lower bounds.

When timer manager 320 has identified the timer value, timer manager 320 sets a timer, using operating system 322, for a length of time corresponding to the identified value. In the embodiment that timer manager 320 received a channel identifier from broadcast manager 310, timer manager 320 associates the timer with that channel identifier and timer manager 320 internally stores the timer value or upper and lower bounds it identified, associated with any channel identifier for the timer.

When the timer expires, operating system 322 signals broadcast manager 310, or alternatively provides broadcast manager 310 with a signal corresponding to the channel identifier associated with the timer. When so signaled, optionally after identifying the channel to which the timer corresponds, broadcast manager 310 again broadcasts the highest sequence number command that was retained as described above, or the command retained for that channel identifier, via radio 312, using the appropriate channel if a channel identifier was received. Broadcast manager 310 continues to retain the command and optional channel identifier, for example, in an internally stored circular buffer of recent commands. Broadcast manager 310 also signals timer manager 320, optionally with the channel identifier. Timer manager 320 sets the timer as described above. The cycle of periodically broadcasting the command will continue until a new command is received, or in the embodiment that multiple channels are used, until a new command is received for the same channel, causing broadcast manager 310 to optionally clear the timer and discard the retained information as described above, and to repeat the broadcast cycle described above using the new command.

In one embodiment, either before or after the highest sequence number command is sent, broadcast manager 310 identifies whether any devices have reported any missing commands as described herein since the last time broadcast manager 310 checked for such reports of missing commands. If so, broadcast manager 310 retrieves the commands missing and broadcasts them as make up commands via radio 312. In one embodiment, broadcast manager 310 first selects a random number, and based on the random number, will send zero, one or more of the missing commands. If only some of the commands are to be sent, the random number may be used (or other one or more random numbers may be used) to select which of the missing commands broadcast manager 310 sends.

At any time, radio 312 may receive commands or indications from any one of several broadcast receivers, such as broadcast receiver 302 as described below. It is noted that broadcast receivers 302-304 not only receive, but retransmit the commands received from one or more broadcast originators 300 as described herein. In one embodiment, radio 312 continually scans for communications on each of the frequencies used by the system. When a command or indication is received, radio 312 stores the command or indication into buffer 318 which may be part of radio 312 or a separate area of memory or disk storage. In the embodiment that multiple channels are used, and that channels correspond to different frequencies, radio 312 adds to the command in buffer 318 an identifier of the channel on which it was received. (In the embodiment that logical channels are used, the command will arrive with a logical channel identifier, and radio 312 stores the logical channel identifier with the command). The sequence number will be received as part of the command and will be stored with it.

Occasionally, such as approximately once every one tenth of a second, receipt manager 314 checks buffer 318 for new commands or indications. Whenever receipt manager 314 finds a command or indication stored in buffer 318, receipt manager 314 retrieves the command and/or indication and optionally, the channel identifier. Receipt manager 314 also optionally determines whether the command or indication includes a channel identifier, as may be received with commands on logical channels. Receipt manager 314 logs the date and time (requested from operating system 322), the sequence number, of the command and/or any sequence number or numbers of the indications and any channel identifier, in log storage 316. In one embodiment, log storage 316 is memory or disk storage that may be arranged as a conventional circular buffer. When receipt manager 314 has logged the sequence number or numbers, date and time along with any channel identifier, in one embodiment, receipt manager 314 discards the command or indication. The stored sequence numbers and optionally, channel identifiers are used as described herein to set the timer value.

In one embodiment, when a command is received, receipt manager 314 scans log storage 316 and identifies whether the received command is out of order or will cause the number of times the highest sequence number command has been received exceeds the threshold for the first time, or whether an indication indicates the highest sequence number command or any command has not been received. If so, receipt manager 314 signals timer manager 320, which recalculates the timer value as described above and, as indicated by receipt manager 314, optionally adjusts the timer value based on the remaining amount of the previously identified timer, which timer manager 320 reads from operating system 322. Timer manager 320 then resets the timer using the timer value it identifies and internally stores the unadjusted new timer value (or the upper and lower bounds used to select it) it identified.

Receiving Devices

Figure 3C:
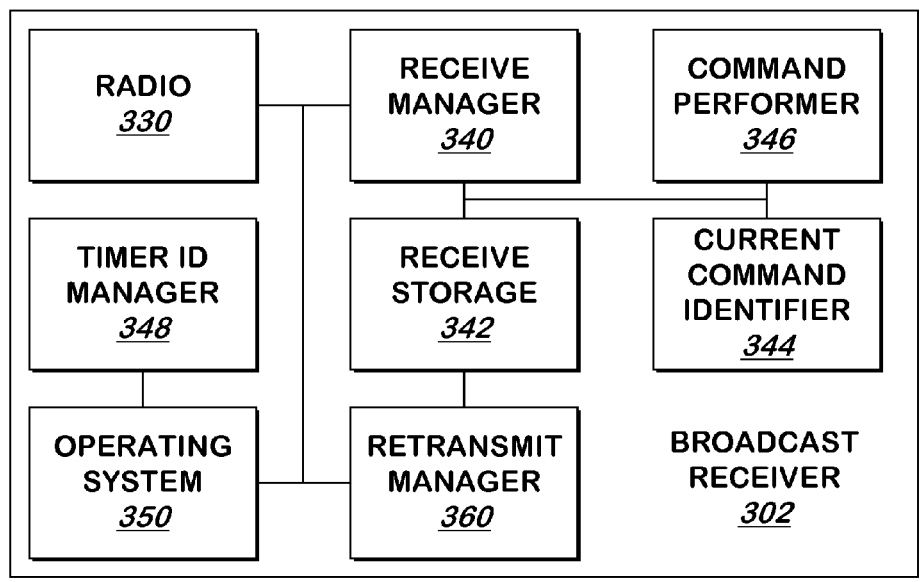

FIG. 3C shows broadcast receiver 302 in more detail, according to one embodiment of the present invention. Broadcast receivers 303, 304 operate similarly or identically to broadcast receiver 302. Referring now to FIG. 3C, at any time, radio 330 of broadcast receiver 302 may receive commands broadcast by a broadcast originator, such as broadcast originator 300 as described above or commands or indications rebroadcast by another broadcast receiver 303, 304. In one embodiment, radio 330 is a conventional IEEE 802.15.x-compatible radio that provides some or all of the capabilities described by one or more 802.15.x specifications. Radio 330 transmits and receives data over a wireless network, though wired networks may also be used. Other radios and/or protocols may be used, such as the conventional 802.11 a/b/g/h or other similar protocols. In one embodiment, radio 330 continually scans for communications or indications on each of the one or more frequencies used by the system. When radio 330 receives a command or indication, radio 330 stores the command or indication into a buffer it maintains internally or an external buffer in a separate area of memory or disk storage. In the embodiment that multiple channels are used, and that channels correspond to different frequencies, radio 330 stores associated with the command or indication an identifier of the channel on which it was received. If logical channels are used, radio 330 stores associated with the command the logical channel identifier received with it.

Occasionally, such as approximately once every one tenth of a second, receive manager 340 checks the buffer in radio 330 for new commands or indications. Whenever receive manager 340 finds a new command or indication in the buffer, receive manager 340 retrieves and parses the command or indication. In one embodiment, because data other than commands or indications may be transmitted through frequencies monitored by radio 330 and therefore may also be received and stored by radio 330, receive manager 340 compares the retrieved command or indication to a list of executable commands or properly formatted indications that may for example be provided by a system administrator and internally stored by receive manager 340. In this embodiment, if the retrieved command or indication does not match a command on the list or have the proper format for an indication, in one embodiment, receive manager 340 discards the command or indication. Otherwise, receive manager 340 requests and receives the current time and date from operating system 350. Receive manager 340 logs the command or indication, sequence number or numbers, time and date, along with the channel identifier if one was included in the command, in receive storage 342.

In one embodiment, receive manager 340 also logs in receive storage 342 the command, if the sequence number is higher than any received sequence number (for the channel), or the indication. In one embodiment, receive storage 342 is memory or disk storage that may be arranged as a conventional circular buffer. Receive manager 340 also locates the sequence number of the command and provides this value to current command identifier 344, along with the channel identifier if one was included in, or with, the command. Receive manager 340 retains the command. Additionally, in one embodiment, receive manager 340 uses operating system 350 to clear any timer currently running, or in the embodiment that a channel identifier was included in the command, any timer associated with that channel identifier.

When current command identifier 344 receives the sequence number and optionally the channel identifier, current command identifier 344 compares the received sequence number to any previously stored sequence number, or to any previously stored sequence number corresponding to that channel identifier. If no sequence number was previously stored, or if the previously stored sequence number is lower than the received sequence number, current command identifier 344 provides an indication to receive manager 340 that the received sequence number is higher. Current command identifier 344 stores the sequence number, associated with the channel identifier if one was received, overwriting any previously stored highest sequence number or any previously stored highest sequence number for that channel.

If the previously stored highest sequence number is equal to the received sequence number, current command identifier 344 discards the received information and provides an indication to receive manager 340 that the received sequence number is equal. If the previously stored highest sequence number is higher than the received sequence number, current command identifier 344 discards the received information and provides an indication to receive manager 340 that the received sequence number is out of order, and may provide the difference between the received sequence number and the highest sequence number.

When receive manager 340 receives the indication from current command identifier 344, if the indication is that the received sequence number is equal or lower, receive manager 340 stores in receive storage 342 with the command or indication the indication (and the difference, if provided) with the date and time of the command, discards the retained command or indication of a missed command, and continues checking for new commands as described above.

Otherwise, if the indication is that the received sequence number is higher, receive manager 340 provides the command (and channel identifier) to command performer 346, which proceeds as described below. Receive manager 340 also signals timer identification manager 348, or in the embodiment that the command includes a channel identifier, receive manager 340 provides the channel identifier to timer identification manager 348, which proceeds as described below.

Additionally, also if the indication is that the received sequence number is higher, receive manager 340 provides the command (and channel identifier) to retransmit manager 360, which retains the command for use as described below. In one embodiment, retransmit manager 360 discards any previously retained command, or in the embodiment that multiple channels are used, retransmit manager 360 discards any previously retained command with the same channel identifier as the newly received command. In another embodiment, several commands, or several commands for each channel may be retained, and the discarding is performed for the oldest command that exceeds the number of commands to be stored or to be stored for the channel.

When receive manager 340 has provided the command to retransmit manager 360 and to command performer 346, and has signaled or provided the channel identifier to timer identification manager 348, receive manager 340 discards the command and continues checking for new commands as described above.

In one embodiment, current command identifier 344 retains the highest sequence number corresponding to each channel and detects whether, for a received sequence number that is higher than the previously received sequence number (for the channel corresponding to the received command). If a gap appears between the former highest sequence number for a channel and the most recently received, but higher sequence number for the channel, current command identifier 344 indicates the missing sequence numbers to receive manager 340. In such case, receive manager 340 may ignore such most recently received command when some sequence numbers were missing, thereby causing the rebroadcast of the previously received sequence number as the highest received sequence number as described herein. In another embodiment, receive manager 340 provides the sequence number of the command and any missing sequence numbers (and optionally the channel identifier) to retransmit manager 360. In one embodiment, retransmit manager 360 will include such sequence numbers in an indication broadcast with the next rebroadcast command (for the channel) or will broadcast them separately, as part of an indication as described herein. As described above, retransmit manager 360 maintains a list of sequence numbers for commands not received by the device containing retransmit manager 360 and continues to broadcast indications for sequence numbers on the list, or retransmits the highest sequence number for which no earlier sequence number appears on that lust. Entries on the list may be timestamped when added and removed after a threshold amount of time.

Receive manager 340 and retransmit manager 360 each internally maintain a list of missing sequence numbers (for each channel). As commands are received as make up commands, they will be received by receive manager 340 in the same manner commands are received. If a make up command is received having a sequence number (for the channel on which it was received) that is on the list for that channel, receive manager 340 provides such commands to command performer 346 to be performed, takes the sequence number or numbers of any make up commands off the list of missing commands it maintains (for the channel on which the command was received) and provides the sequence number to retransmit manager 360, which removes it from the list it maintains.

When command performer 346 receives the command, in one embodiment command performer 346 performs the command. The command may be, for example, to power on or power off another subsystem (not shown), to actuate a motor that moves the device or to provide data. In another embodiment, before performing the command, command performer 346 checks the channel identifier of the command or the command itself. In this embodiment, the command is only performed if the channel identifier matches an entry in a list of channel identifiers, which may for example be provided by a system administrator and internally stored by command performer 346, or if the command otherwise indicates that the device should perform the command. This allows commands to be broadcast that will be executed by some broadcast receivers and not by others.

In one embodiment, receive manager 340 will not provide to command performer 346 commands (and their respective channel identifiers) having sequence numbers after missing commands, to avoid such commands from being performed out of order. In this embodiment, receive manager 340 stores the commands (and channel identifiers) and provides to command performer 346 only commands that are the first received on a channel, or those for which the immediately prior sequence number command was provided (for that channel).

In one embodiment, the date and time of the command are retrieved from the operating system and stored, and commands (and the channel identifier) may be provided to command performer 346 by receive manager 340 after a threshold amount of time. In this case, receive manager 340 may clear the list of commands not received and provide the sequence numbers cleared from the list to retransmit manager 360, which removes them from its list.

As described in more detail below, a timer, or a timer for each channel is set. When the timer expires, operating system 350 signals retransmit manager 360, or in the embodiment that multiple channels are used, provides retransmit manager 360 with the timer or interrupt identifier that it can use to identify the channel identifier associated with the timer. When so signaled, or when retransmit manager 360 receives the channel identifier, retransmit manager 360 broadcasts the command received from receive manager 340 and retained as described above, or broadcasts the retained command associated with that channel identifier, via radio 330, in one embodiment using the channel identified in the command. The sequence number is retransmitted as part of the command. Retransmit manager 360 also signals timer identification manager 348, optionally with the channel identifier, and timer identification manager 348 checks the sequence numbers and dates and times of the received commands in receive storage 342, and sets the timer as described in more detail herein. The cycle of periodically retransmitting the command will continue thereafter until retransmit manager 360 receives a new command, or a new command for that channel, from receive manager 340.

In one embodiment, with each command, retransmit manager 360 broadcasts, retransmit manager 360 also broadcasts an indication of the missing sequence numbers from its list (that correspond to the same channel as the command). The indication may be separately broadcast by retransmit manager 360 before or after the broadcast of such command.

In one embodiment, before or after it broadcasts the command, retransmit manager 360 checks receive storage 342 for received commands or received commands for the channel, that are out of order by more than one command, or indications that indicate that one or more commands have been missed, since the last time it performed any retransmission, which retransmit manager 360 retrieves from operating system 350 at each retransmit time, and internally stores. If any such commands or indications are received since the last time it checked for such indications of such missing commands (as indicated by a sequence number for a command or a command for the channel being earlier by more than one than the highest previously received sequence number, or highest previously received sequence number for the channel, or any command received or separately received indication that indicates that one or more commands prior to the highest sequence number command has not been received as described above), retransmit manager 360 selects a pseudo-random number, and, based on the number, retransmits zero or more of the commands corresponding to any such indications as make up commands, commands having sequence numbers between the out of order one received and the most current one (e.g. the one with the highest number). In another embodiment, a maximum of only one such command is broadcast by any one device, with the specific command broadcast being selected based on the random number. In this manner, some devices will send zero commands while others will send one command, with different devices sending different make up commands.

In one embodiment, when a command or indication is received, receive manager 340 scans receive storage 342 and identifies whether the received command is out of order or will cause the number of times the highest sequence number command has been received exceeds the threshold for the first time or whether an indication is received indicating the highest sequence number command, or any command, was not received. If so, receive manager 340 signals timer identification manager 348, which recalculates the timer value as described herein and, as indicated by receive manager 340, optionally adjusts as described above the timer value based on the prior value, which timer identification manager 348 reads from operating system 350. Timer identification manager 348 then resets the timer using the timer value it identifies.

When timer identification manager 348 is signaled by receive manager 340, or when timer identification manager 348 receives the channel identifier from receive manager 340 as described above, timer identification manager 348 identifies a timer value or timer value for the channel as described above. As described above, in one embodiment, the timer is set to a pseudo random number between predetermined upper and lower bounds. In one embodiment, timer identification manager 348 sets the upper and lower bounds as a function of any of A) the number of out of order commands or indications or indications indicating the highest sequence number command was, or one or more other commands were, not received, received or received for the same channel, B) the number of highest sequence number commands received, or received for the same channel and C)the prior upper and lower bounds used to select the timer value or the prior timer value. Other functions involving rates of receipt may be used. To determine the timer value, timer identification manager 348 may request and receive the current date and time from operating system 350. In one embodiment, timer identification manager 348 determines the number of highest sequence number commands or number of commands indicated as not being received logged in receive storage 342 within a predetermined window of time, for instance since the last time it checked, or in another embodiment timer identification manager 348 uses the channel identifier to determine the number of highest sequence number commands logged in receive storage 342 or indications of missed commands which were received on the same channel within the window of time. In one embodiment, the window of time is the amount of time since the previous timer elapsed, which timer identification manager 348 internally stores or stores for each channel. As described above, in one embodiment, in order to ensure that reasonable timer values are achieved even in periods of radio silence or of extreme radio activity, timer identification manager 348 sets the bounds within the predetermined threshold values: for example, the lower bound may be not lower than one second, and the higher bound may be not higher than thirty seconds.

The upper and lower bounds may be determined using the previous upper and lower bounds or previous upper and lower bounds for the channel as described herein.

When timer identification manager 348 has determined the bounds, timer identification manager 348 generates a pseudo random number within the bounds and determines that number to be the timer value.

When timer identification manager 348 has identified the timer value, timer identification manager 348 sets a timer, using operating system 350, for a length of time corresponding to the identified value. In the embodiment that timer identification manager 348 received a channel identifier from receive manager 340 as described above, timer identification manager 348 associates the timer with the channel identifier included in the command.

It is noted that the command with the highest sequence number indicates that such command is the highest-ordered command. Other embodiments allow the command with the lowest sequence number to indicate the highest-ordered command. It is also noted that an out of order command may be received after the highest-ordered command, and therefore, the highest ordered command need not be the one most recently received.

Some devices may not be in range of the originating device, and will receive all commands as rebroadcasts by receiving devices of commands originated among such devices by the originating device. Thus, the source identifier of the command may not be used in the determination of the highest-ordered command in one embodiment, i.e. by assuming the originating devices commands are always the most current. Instead, the sequence number is used for this purpose.

As described herein, the frequency of the timers is lower, at least on average in embodiments in which the pseudo random number is used, when an event occurs that indicates a device did not receive the highest sequence number command. (Because of the random number selection, sequential timer values may move in the opposite direction in embodiments in which the random number selection technique is used.) The out of order command detection is used as an indicator of this event, but other indicators may also be used. The frequency of the timers is higher, at least on average in embodiments in which the pseudo random number is used, when an event occurs that indicates that one or more nearby devices likely received the highest sequence number command. The number of times this command was received is used as an indicator of this event, though it may also indicate a device did not receive a command. Other indicators may also be used.

Thus, there has been described a computer program product and method of ensuring a plurality of devices receive communications intended for them, the method comprising, at each of the plurality of devices, repeatedly performing a wireless rebroadcasting, each rebroadcasting comprising rebroadcasting a then highest ordered communication received by that device, the repeated rebroadcasting being directed to occur more frequently on average following a detection by that device of one or more events indicating that a different device did not receive at least the highest ordered communication received by that device, and less frequently on average following detection by that device of one or more events indicating that a different device likely received at least the highest ordered communication received by that device.

Optionally, at an originating device from which the communications were previously broadcast before receipt by any of the devices the computer program product and method may additionally include detecting whether some, though not all, devices have detected that other devices did not receive a most recent wireless broadcast communication; and wirelessly rebroadcasting at least one previously broadcast communication responsive to the detecting step.

Optionally, for the computer program product and method, each detection by the plurality of devices comprises detecting that a communication has been rebroadcast out of order.

Optionally, for the computer program product and method, each detection by the plurality of devices comprises a function of a number of communications received per unit of time.

Optionally, for the computer program product and method, the plurality of devices operate sineacknowledgemntly.

Optionally, for the computer program product and method, at least some of the plurality of devices rebroadcast at least one communication older than the communication with the highest sequence number upon detection of an event indicating that at least one of the plurality of devices did not receive more than one communication.

Optionally, for the computer program product and method, each of the devices performs said rebroadcasting for each of a plurality of channels, the rebroadcasting for each channel by a device being performed independently of the rebroadcasting performed for a different channel by said device.

Optionally, for the computer program product and method, an amount of time between successive rebroadcastings is at least partly determined at least pseudo-randomly.

Optionally, for the computer program product and method, an amount of time between successive rebroadcastings is subject to at least one boundary.

There has also been described a system for ensuring a plurality of devices receive communications intended for them, the system comprising the plurality of devices, including a receive manager having an input coupled to a radio for wirelessly receiving at least some of a plurality of communications comprising an indication of an order of the communications, each receive manager for providing at an output the plurality of communications received, a retransmit manager having an input coupled to the receive manager output for receiving at least some of the plurality of communications and an output coupled to a radio, the retransmit manager for repeatedly performing a wireless rebroadcasting via its output coupled to the radio, each rebroadcasting comprising rebroadcasting a then highest ordered communication received from the receipt manager according to the indication, the frequency of repeated rebroadcasting being responsive to a timer signal received at a timer input, a timer identification manager having an input coupled to the receive manager output for receiving information regarding a time of receipt of each of the at least some of the plurality of communications, and an output coupled to the broadcast manager timer input, the timer identification manager for causing the signal to be provided at the timer identification manager output coupled to the retransmit manager timer input more frequently on average responsive to a determination made using the information that one or more events indicating that a different device did not receive at least the highest ordered communication received by that device have occurred during a time window, and less frequently on average following detection by that device of one or more events indicating that a different device likely received at least the highest ordered communication received by that device during the time window.

The system may additionally include an originating device from which the communications were previously broadcast before receipt by any of the devices, the originating device including a receive manager having an input coupled to a radio for receiving at least some of the rebroadcasts from at least some of the plurality of devices, the receive manager for providing at an output information regarding the at least some of the rebroadcasts received at the receive manager input, a timer manager having an input coupled to the receive manager output for receiving the information, the timer manager for determining whether some, but not all, devices have detected that other devices did not receive a most recent wireless broadcast communication responsive to the information and causing at an output a timer signal to be provided responsive to said determining, and a broadcast manager having a first input for receiving communications to be broadcast, and a second input coupled to the timer manager output for receiving the timer signal, the broadcast manager for rebroadcasting at least one previously broadcast communication responsive to the timer signal.

The system may include a feature whereby each detection by the timer identification managers of each of the plurality of devices comprises detecting that a communication has been rebroadcast out of order.

The system may include a feature whereby each detection by each of the timer identification managers in each of the plurality of devices comprises a function of a number of communications received per unit of time.

The system may include a feature whereby the plurality of devices operate sineacknowledgemntly.

The system may include a feature whereby each of the devices performs said rebroadcasting for each of a plurality of channels, the rebroadcasting for each channel by a device being performed independently of the rebroadcasting performed for a different channel by said device.

The system may include a feature whereby the timer identification manager causes the signal to be provided at the timer identification manager output responsive to at least a pseudo random number.

The system may include a feature whereby the timer identification manager causing the signal to be provided at the timer identification manager output additionally subject to at least one boundary.

It is noted that the highest sequence number command (for a channel) as described herein is, with respect to the originating device, the highest one (for the channel) sent by the originating device, and for any receiving device, the highest one (for the channel) received by that device from the originating device or another device.

It is noted that the term "highest" refers to the ordering arrangement used, and not the actual value of the sequence number. For example, numbering arrangements may be used in which the highest sequence number command has a lower value sequence number than the one before it.

There has also been described a computer program product for, and method of, ensuring a plurality of devices receive communications intended for them, the method including at each of the plurality of devices, repeatedly performing a wireless rebroadcasting, each rebroadcasting comprising rebroadcasting a then highest ordered communication received by that device, the repeated rebroadcasting being directed to occur more frequently on average following a detection by that device of one or more events indicating that a different device did not receive at least the highest ordered communication received by that device, and less frequently on average following detection by that device of one or more events indicating that a different device likely received at least the highest ordered communication received by that device, at least one such communication not being received by a first at least one of the plurality of devices, at a second at least one of the plurality of devices, detecting that the first at least one of the plurality of devices did not receive at least one communication other than the then current highest ordered communication received by the second at least one of the plurality of devices and that had been rebroadcast by at least some of the second at least one of the plurality of devices; and rebroadcasting by at least one of the second at least one of the plurality of devices, at least one of the at least one communication other than the highest ordered communication responsive to the detecting step.

The detecting is optionally responsive to a receipt of a broadcast by the different device of a communication ordered more than one prior to the then current highest ordered communication received by said device.

The detecting is optionally responsive to a receipt from at least one of the first at least one of the plurality of devices of an indication that the first at least one of the plurality of devices did not receive the at least one communication.

The indication is optionally received with the rebroadcasted then current highest ordered communication received by each respective first at least one of the plurality of devices.

The rebroadcasting the at least one of the at least one communication other than the highest ordered communication is optionally additionally responsive to at least a pseudo random number.

There is also disclosed a system for ensuring a plurality of devices receive communications intended for them, the system including a plurality of devices, each of the plurality of devices in wireless communication with at least one of the other devices in the plurality, each of the devices for repeatedly performing a wireless rebroadcasting, each rebroadcasting comprising rebroadcasting a then highest ordered communication received by that device, the repeated rebroadcasting being directed to occur more frequently on average following a detection by that device of one or more events indicating that a different device did not receive at least the highest ordered communication received by that device, and less frequently on average following detection by that device of one or more events indicating that a different device likely received at least the highest ordered communication received by that device, at least one such communication not being received by a first at least one of the plurality of devices, and a second at least one of the plurality of devices for detecting that the first at least one of the plurality of devices did not receive at least one communication other than the then current highest ordered communication received by the second at least one of the plurality of devices and that had been rebroadcast by at least some of the second at least one of the plurality of devices, and rebroadcasting by at least one of the second at least one of the plurality of devices, at least one of the at least one communication other than the highest ordered communication responsive to the detecting.

The detecting is optionally responsive to a receipt of a broadcast by the different device of a communication ordered more than one prior to the then current highest ordered communication received by said device.

The detecting is optionally responsive to a receipt from at least one of the first at least one of the plurality of devices of an indication that the first at least one of the plurality of devices did not receive the at least one communication.

The indication is optionally received with the rebroadcasted then current highest ordered communication received by each respective first at least one of the plurality of devices.

The rebroadcasting the at least one of the at least one communication other than the highest ordered communication is optionally additionally responsive to at least a pseudo random number.

What is claimed is:

1. A method comprising:
   identifying a timer value associated with a network channel in a communications network;
   determining whether a command corresponding to the network channel is received out of sequence in a most recent period indicated by the timer value;
   identifying a first adjustment to the timer value based on determining whether the command is received out of sequence, the first adjustment to the timer value providing an adjusted timer value;
   determining a number of times that a particular command is received;
   identifying a second adjustment to the adjusted timer value based on determining the number of times that the particular command is received, the second adjustment to the adjusted timer value providing a resulting timer value;
   determining whether the resulting timer value is outside of a range of allowed adjustment results;
   based on determining that the resulting timer value is not outside of the range of allowed adjustment results, identifying an upper bound and a lower bound associated with the resulting timer value;
   selecting a random or pseudo-random number between the upper bound and the lower bound; and
   establishing a new timer value based on the selected random or pseudo-random number.

2. The method of claim 1, wherein identifying a timer associated with the network channel comprises:
   determining that a prior timer value is not used; and
   based on determining that the prior timer value is not used, selecting an initial value as the timer value.

3. The method of claim 2, wherein selecting an initial value as the timer value comprises selecting the initial value from the group consisting of a lowest possible value, a highest possible value, a value in between the lowest possible value and the highest possible value and an average of a prior upper bound and a prior lower bound for the timer value.

4. The method of claim 1, wherein the most recent period is determined as an amount of time between a current time and a prior time at which the timer value was identified or elapsed.

5. The method of claim 1, wherein identifying a first adjustment to the timer value comprises:
   based on determining that a command is received out of sequence, identifying the first adjustment as a fixed number that is equal to or below zero; and
   adding the first adjustment to the timer value.

6. The method of claim 1, wherein identifying a first adjustment to the timer value comprises:
   based on determining that no command is received out of sequence, identifying the first adjustment as a fixed number that is equal to or above zero; and
   adding the first adjustment to the timer value.

7. The method of claim 1, wherein determining whether the resulting timer value is outside of a range of allowed adjustment results comprises:
   based on determining that the resulting timer value is outside of the range of allowed adjustment results, setting the resulting timer value to a nearest boundary value of the range.

8. The method of claim 1, comprising:
   receiving information associated with a command;
   examining the received information;
   determining, based on examining the received information, whether the command is out of order, whether the command was not received, whether the command is a highest sequence number command, or whether a number of times the command was received has exceeded a threshold value;
   based on determining at least one of: the command is out of order, the command was not received, the command is the highest sequence number command, and the number of times the command was received has exceeded the threshold value, recalculating the timer value for providing a newly identified timer value; and
   setting the timer value based on the newly identified timer value.

9. The method of claim 8, wherein setting the timer value based on the newly identified timer value comprises:
   subtracting from the newly identified timer value an amount of time remaining on an existing timer;
   determining whether a result of the subtracting is negative; and
   based on determining that the result of the subtracting is not negative, setting the result of the subtracting as the timer value.

10. The method of claim 9, comprising:
based on determining that the result of the subtracting is negative, setting zero as the timer value.

11. A method comprising:
receiving commands associated with a network channel in a communications network;
receiving information from a neighboring network device indicating that the network device did not receive a command;
responsive to receiving the information, selecting a random number; and
sending missing commands to the neighboring network device based on the selected random number, including an indicator that the missing commands are sent as make up commands.

12. The method of claim 11, wherein receiving information from a neighboring network device indicating that the network device did not receive a command comprises receiving information from the neighboring network device that includes at least one of:
a command with a sequence number that is two or more less than a highest sequence number command sent or received, and
an indication from the neighboring network device that it did not receive one or more commands.

13. The method of claim 11, wherein sending missing commands to the neighboring network device comprises sending zero, one or more commands indicated as not received by the neighboring network device, and
wherein at least one of a number of missing commands sent and which missing commands are sent, is based on the selected random number.

14. A system comprising:
a processor; and
instructions encoded in a non-transitory machine readable medium for execution by the processor and configured to cause the processor to perform operations comprising:
identifying a timer value associated with a network channel in a communications network;
determining whether a command corresponding to the network channel is received out of sequence in a most recent period indicated by the timer value;
identifying a first adjustment to the timer value based on determining whether the command is received out of sequence, the first adjustment to the timer value providing an adjusted timer value;
determining a number of times that a particular command is received;
identifying a second adjustment to the adjusted timer value based on determining the number of times that the particular command is received, the second adjustment to the adjusted timer value providing a resulting timer value;
determining whether the resulting timer value is outside of a range of allowed adjustment results;
based on determining that the resulting timer value is not outside of the range of allowed adjustment results, identifying an upper bound and a lower bound associated with the resulting timer value;
selecting a random or pseudo-random number between the upper bound and the lower bound; and
establishing a new timer value based on the selected random or pseudo-random number.

15. The system of claim 14, wherein the instructions that are configured to cause the processor to perform operations comprising identifying a timer value associated with the network channel comprises instructions that are configured to cause the processor to perform operations comprising:
determining that a prior timer value is not used; and
based on determining that the prior timer value is not used, selecting an initial value as the timer value.

16. The system of claim 14, wherein selecting an initial value as the timer value comprises selecting the initial value from the group consisting of a lowest possible value, a highest possible value, a value in between the lowest possible value and the highest possible value and an average of a prior upper bound and a prior lower bound for the timer value.

17. The system of claim 14, wherein the most recent period is determined as an amount of time between a current time and a prior time at which the timer value was identified or elapsed.

18. The system of claim 14, wherein the instructions that are configured to cause the processor to perform operations comprising identifying a first adjustment to the timer value comprises instructions that are configured to cause the processor to perform operations comprising:
based on determining that a command is received out of sequence, identifying the first adjustment as a fixed number that is equal to or below zero; and
adding the first adjustment to the timer value.

19. The system of claim 14, wherein the instructions that are configured to cause the processor to perform operations comprising identifying a first adjustment to the timer value comprises instructions that are configured to cause the processor to perform operations comprising:
based on determining that no command is received out of sequence, identifying the first adjustment as a fixed number that is equal to or above zero; and
adding the first adjustment to the timer value.

20. The system of claim 14, wherein the instructions that are configured to cause the processor to perform operations comprising determining whether the resulting timer value is outside of a range of allowed adjustment results comprises instructions that are configured to cause the processor to perform operations comprising:
based on determining that the resulting timer value is outside of the range of allowed adjustment results, setting the resulting timer value to a nearest boundary value of the range.

21. The system of claim 14, comprising instructions that are configured to cause the processor to perform operations comprising:
receiving information associated with a command;
examining the received information;
determining, based on examining the received information, whether the command is out of order, whether the command was not received, whether the command is a highest sequence number command, or whether a number of times the command was received has exceeded a threshold value;
based on determining at least one of: the command is out of order, the command was not received, the command is the highest sequence number command, and the number of times the command was received has exceeded the threshold value, recalculating the timer value for providing a newly identified timer value; and
setting the timer value based on the newly identified timer value.

22. The system of claim. 21, wherein the instructions that are configured to cause the processor to perform operations comprising setting the timer value based on the newly identified timer value comprises instructions that are configured to cause the processor to perform operations comprising:

subtracting from the newly identified timer value an amount. of time remaining on an existing timer;

determining whether a result of the subtracting is negative; and based on determining that the result of the subtracting is not negative, setting the result of the subtracting as the timer value.

23. A system comprising:

a processor; and instructions encoded in a non-transitory machine readable medium for execution by the processor and configured to cause the processor to perform operations comprising:

receiving commands associated with a network channel in a communications network;

receiving information from a neighboring network device indicating that the network device did not receive a command;

responsive to receiving the information, selecting a random number; and sending missing commands to the neighboring network device based on the selected random number, including an indicator that the missing commands are sent as make up commands.

24. The system of claim 23, wherein the instructions that are configured to cause the processor to perform operations comprising receiving information from a neighboring network device indicating that the network device did not receive a command comprises instructions that are configured to cause the processor to perform operations comprising receiving information from the neighboring network device that includes at least one of:

a command with a sequence number that is two or more less than a highest sequence number command sent or received, and an indication from the neighboring network device that it did not receive one or more commands.

25. The system of claim 23, wherein the instructions that are configured to cause the processor to perform operations comprising sending missing commands to the neighboring network device comprises instructions that are configured to cause the processor to perform operations comprising sending zero, one or more commands indicated as not received by the neighboring network device, and wherein at least one of a number of missing commands sent and which missing commands are sent, is based on the selected random number.

* * * * *